US012688402B2

(12) United States Patent
Sahu et al.

(10) Patent No.: US 12,688,402 B2
(45) Date of Patent: Jul. 21, 2026

(54) METHOD AND SYSTEM OF MACHINE FAULT CLASSIFICATION USING LABEL-CONSISTENT CONVOLUTIONAL DICTIONARY LEARNING

(71) Applicant: Tata Consultancy Services Limited, Mumbai (IN)

(72) Inventors: Saurabh Sahu, Bangalore (IN); Kriti Kumar, Bangalore (IN); Achanna Anil Kumar, Bangalore (IN); Mariswamy Girish Chandra, Bangalore (IN); Angshul Majumdar, New Delhi (IN)

(73) Assignee: Tata Consultancy Services Limited, Mumbai (IN)

( * ) Notice: Subject to any disclaimer, the term of this patent is extended or adjusted under 35 U.S.C. 154(b) by 102 days.

(21) Appl. No.: 18/793,331

(22) Filed: Aug. 2, 2024

(65) Prior Publication Data

US 2026/0079802 A1      Mar. 19, 2026

(30) Foreign Application Priority Data

Aug. 23, 2023    (IN) .............................. 202321056609

(51) Int. Cl.
| | |
|---|---|
| *G06F 11/00* | (2006.01) |
| *G06F 11/22* | (2006.01) |
| *G06N 3/0464* | (2023.01) |
| *G06N 5/04* | (2023.01) |

(52) U.S. Cl.
CPC ....... *G06N 3/0464* (2023.01); *G06F 11/2252* (2013.01); *G06F 11/2257* (2013.01); *G06N 5/04* (2013.01)

(58) Field of Classification Search
None
See application file for complete search history.

(56) References Cited

U.S. PATENT DOCUMENTS

| | | | | |
|---|---|---|---|---|
| 2025/0053166 A1* | 2/2025 | Park | .................. | G05B 23/0283 |
| 2025/0068892 A1* | 2/2025 | Sahu | .................... | G06N 3/0464 |

FOREIGN PATENT DOCUMENTS

| | | | |
|---|---|---|---|
| CN | 115840419 A | * | 3/2023 |
| EP | 3710809 A1 | | 9/2020 |

OTHER PUBLICATIONS

Jiang et al., "Joint Label Consistent Dictionary Learning and Adaptive Label Prediction for Semisupervised Machine Fault Classification" (Year: 2016).*

(Continued)

*Primary Examiner* — Bryce P Bonzo
*Assistant Examiner* — Gabriella Kanani Shelton
(74) *Attorney, Agent, or Firm* — Finnegan, Henderson, Farabow, Garrett & Dunner, LLP

(57)      ABSTRACT

Existing Convolutional Dictionary Learning (CDL) based machine fault classification do not utilize label information while learning the dictionary, hence the representation learned are not class-discriminative. Method and system disclosed herein provide a label-consistent convolutional dictionary learning approach for machine fault classification. The approach involves generating a training data for a classifier, wherein coefficients forming a plurality of class-discriminative features form the training data. The training data is then used to train a classifier, which is then used to perform machine fault classification for a given test data.

12 Claims, 6 Drawing Sheets

(56)          References Cited

OTHER PUBLICATIONS

Sahu et al., "Label-Consistent Convolutional Dictionary Learning for Machine Inspection," Nov., 2023 31st European Signal Processing Conference (EUSIPCO), Helsinki, Finland, 2023, pp. 1883-1887 (Year: 2023).*

Singhal et al., "Supervised Deep Dictionary Learning for Single Label and Multi-Label Classification," 2018 International Joint Conference on Neural Networks (IJCNN), Rio de Janeiro, Brazil, 2018, pp. 1-7 (Year: 2018).*

Tian et al., "Cross-Domain Joint Dictionary Learning for ECG Inference From PPG," in IEEE Internet of Things Journal, vol. 10, No. 9, pp. 8140-8154, 2023 (Year: 2023).*

Zhang et al., "Robust Locality-Constrained Label Consistent K-SVD by Joint Sparse Embedding," 2018 24th International Conference on Pattern Recognition (ICPR), Beijing, China, 2018, pp. 1664-1669 (Year: 2018).*

Wikipedia, "Sparse dictionary learning" (Year: 2025).*

Gu, Xiaoqing et.al, "Brain Tumor MR Image Classification Using Convolutional Dictionary Learning With Local Constraint", Title of the item: Front. Neurosci., Date: 2021, vol. 15, Publisher: Frontiers, Link: https://www.frontiersin.org/journals/neuroscience/articles/10.3389/fnins.2021.679847/full.

Shao, Shuai et al., "Label embedded dictionary learning for image classification", Title of the item: Neurocomputing, Date: 2020, vol. 385, Publisher: Science Direct, Link: https://www.sciencedirect.com/science/article/abs/pii/S0925231219317801.

Jiang, Weiming et al., "Joint Label Consistent Dictionary Learning and Adaptive Label Prediction for Semisupervised Machine Fault Classification", Title of the item: IEEE Transactions on Industrial Informatics, Date: Feb. 2016, vol. 12; Issue: 01, Publisher: Science Direct, Link: https://ieeexplore.ieee.org/document/7312982.

* cited by examiner

100

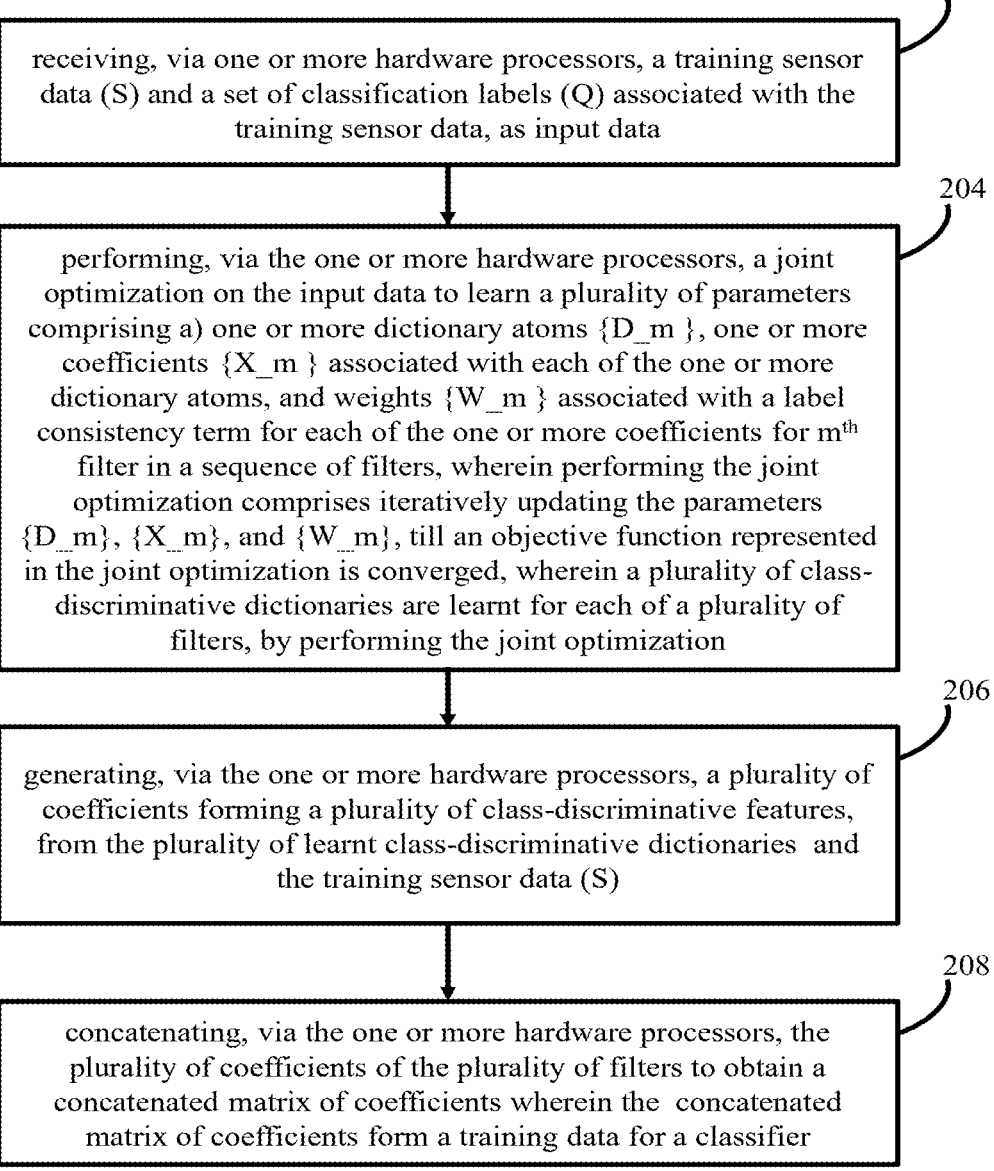

202 receiving, via one or more hardware processors, a training sensor data (S) and a set of classification labels (Q) associated with the training sensor data, as input data

204 performing, via the one or more hardware processors, a joint optimization on the input data to learn a plurality of parameters comprising a) one or more dictionary atoms {D_m }, one or more coefficients {X_m } associated with each of the one or more dictionary atoms, and weights {W_m } associated with a label consistency term for each of the one or more coefficients for $m^{th}$ filter in a sequence of filters, wherein performing the joint optimization comprises iteratively updating the parameters {D_m}, {X_m}, and {W_m}, till an objective function represented in the joint optimization is converged, wherein a plurality of class-discriminative dictionaries are learnt for each of a plurality of filters, by performing the joint optimization

206 generating, via the one or more hardware processors, a plurality of coefficients forming a plurality of class-discriminative features, from the plurality of learnt class-discriminative dictionaries and the training sensor data (S)

208 concatenating, via the one or more hardware processors, the plurality of coefficients of the plurality of filters to obtain a concatenated matrix of coefficients wherein the concatenated matrix of coefficients form a training data for a classifier

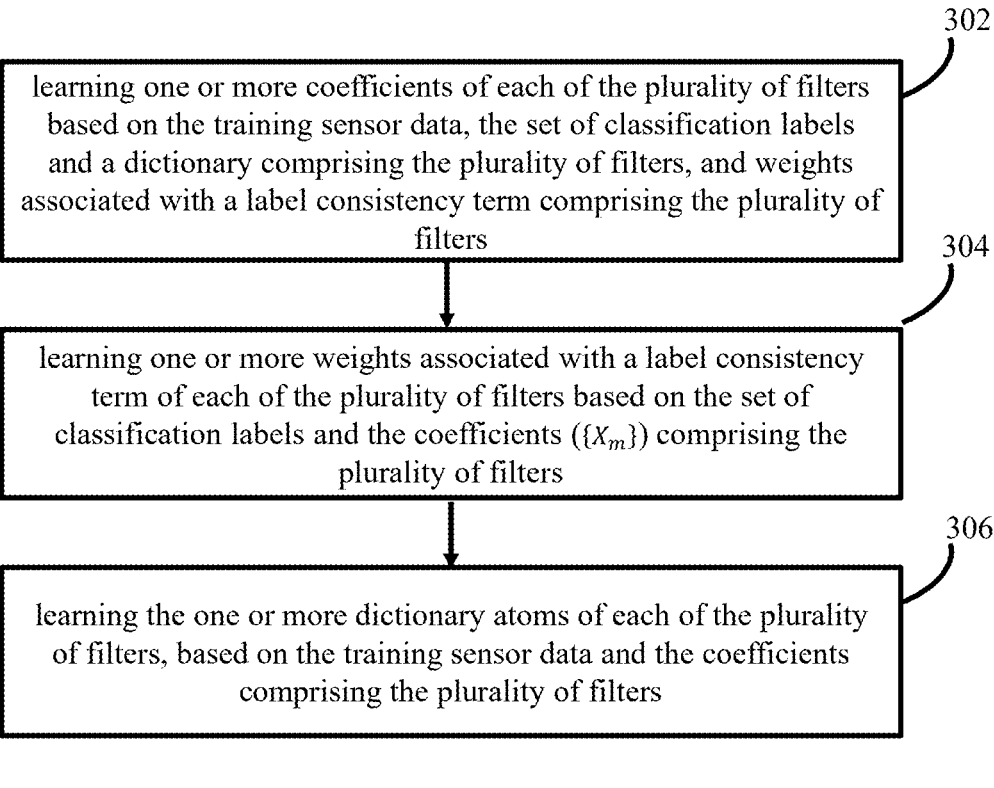

302 learning one or more coefficients of each of the plurality of filters based on the training sensor data, the set of classification labels and a dictionary comprising the plurality of filters, and weights associated with a label consistency term comprising the plurality of filters

304 learning one or more weights associated with a label consistency term of each of the plurality of filters based on the set of classification labels and the coefficients ($\{X_m\}$) comprising the plurality of filters

306 learning the one or more dictionary atoms of each of the plurality of filters, based on the training sensor data and the coefficients comprising the plurality of filters

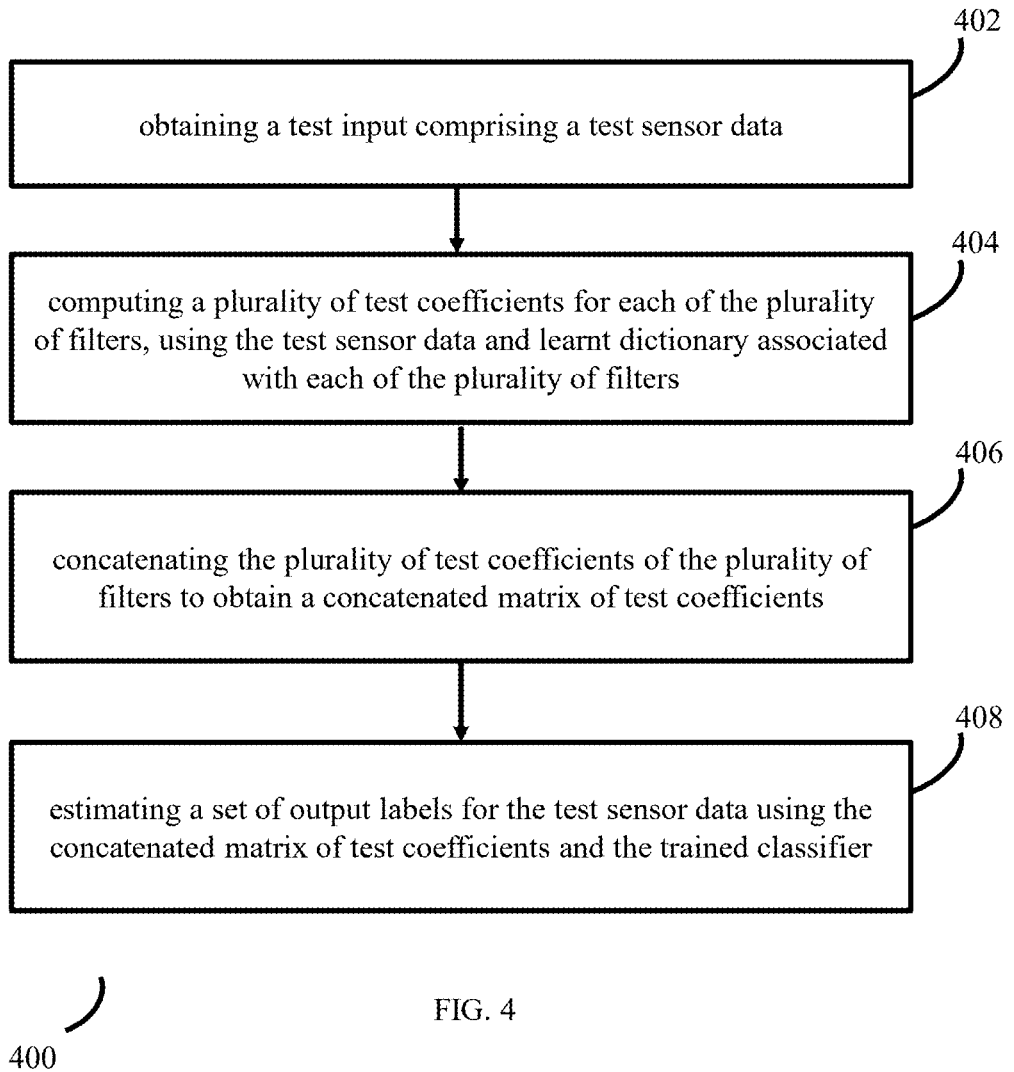

402 obtaining a test input comprising a test sensor data

404 computing a plurality of test coefficients for each of the plurality of filters, using the test sensor data and learnt dictionary associated with each of the plurality of filters

406 concatenating the plurality of test coefficients of the plurality of filters to obtain a concatenated matrix of test coefficients

408 estimating a set of output labels for the test sensor data using the concatenated matrix of test coefficients and the trained classifier

METHOD AND SYSTEM OF MACHINE FAULT CLASSIFICATION USING LABEL-CONSISTENT CONVOLUTIONAL DICTIONARY LEARNING

PRIORITY CLAIM

This U.S. patent application claims priority under 35 U.S.C. § 119 to: Indian Patent Application No. 202321056609, filed on Aug. 23, 2023. The entire contents of the aforementioned application are incorporated herein by reference.

TECHNICAL FIELD

The disclosure herein generally relates to machine fault diagnosis, and, more particularly, to method and system of machine fault classification using label-consistent convolutional dictionary learning.

BACKGROUND

Maintaining the health of industrial equipment is crucial to avoid economic losses, the decline in production levels, and potential hazards to human life. Numerous industries are adopting more advanced digital technologies involving artificial intelligence for machine condition monitoring to enhance process efficiency and reduce downtime. In the past, researchers have employed various feature-based (domain-crafted) and data-driven approaches to solve complex machine fault diagnosis problems. Although techniques involving domain-specific features are more intuitive and comprehensible, determining the relevant and discriminative features is a challenge and require domain expertise.

Hence, data-driven techniques have recently gained significant attention due to the ability to learn meaningful representations from the data on their own. Most data-driven techniques employ Deep Neural Networks (DNNs) that learn useful patterns and relationships in data through a complex nonlinear mapping between the neural network layers. Thus, DNNs have been applied to a wide variety of problems in machine condition monitoring, including fault classification, remaining useful life prediction, and anomaly detection. Generally, DNNs require a lot of labeled data for training to perform well. However, data is limited in most practical application scenarios of machine inspection. Also, annotations are seldom available, making the classification problem more challenging. To address this, Dictionary Learning (DL) based techniques have been used that can learn efficient representations from limited data. In DL, a sparse representation of the signal is obtained as a linear combination of a small number of basis vectors from the dictionary, and its associated sparse coefficients learned from the data. However, the computational cost of computing the sparse representation for the entire signal is high. Thus, patch based processing is usually employed where the entire signal is divided into low-dimensional overlapping blocks (i.e., patches in image processing). However, the learned basis vectors of patch-based dictionary learning exhibit shift-variant behavior, i.e., basis vectors tend to contain shifted versions of each other. As a result, this approach fails to capture the underlying structure of the entire signal, since each block or patch is synthesized independently. Additionally, the learned dictionaries for an entire signal exhibit high redundancy due to the separate learning of neighboring and overlapping blocks. To address these limitations, Convolutional Dictionary Learning (CDL)

has been proposed to learn shift-invariant dictionaries from the signals and has been successfully applied in various signal and image processing applications. In the context of machine health monitoring, the shift-invariant property of CDL is beneficial in extracting periodic impulses, that are typical signatures of a mechanical fault.

The existing methods based on CDL do not utilize label information while learning the dictionary, hence the representation learned are not class-discriminative.

SUMMARY

Embodiments of the present disclosure present technological improvements as solutions to one or more of the above-mentioned technical problems recognized by the inventors in conventional systems. For example, in one embodiment, a processor implemented method is provided. The method includes receiving, via one or more hardware processors, a training sensor data (S) and a set of classification labels (Q) associated with the training sensor data, as input data. Further, a joint optimization is performed, via the one or more hardware processors, on the input data to learn a plurality of parameters comprising a) one or more dictionary atoms $\{D_m\}$, one or more coefficients $\{X_m\}$ associated with each of the one or more dictionary atoms, and weights $\{W_m\}$ associated with a label consistency term for each of the one or more coefficients for $m^{th}$ filter in a sequence of filters, wherein performing the joint optimization comprises iteratively updating the parameters $\{D_m\}$, $\{X_m\}$, and $\{W_m\}$, till an objective function represented in the joint optimization is converged, wherein a plurality of class-discriminative dictionaries are learnt for each of a plurality of filters, by performing the joint optimization. Further, a plurality of coefficients forming a plurality of class-discriminative features is generated via the one or more hardware processors, from the plurality of learnt class-discriminative dictionaries and the training sensor data (S). Further, the plurality of coefficients of the plurality of filters are concatenated, via the one or more hardware processors, to obtain a concatenated matrix of coefficients wherein the concatenated matrix of coefficients form a training data for a classifier.

In an embodiment of the method, performing the joint optimization includes learning one or more coefficients of each of the plurality of filters based on the training sensor data, the set of classification labels and a dictionary comprising the plurality of filters, and weights associated with a label consistency term comprising the plurality of filters; learning one or more weights associated with a label consistency term of each of the plurality of filters based on the set of classification labels and the coefficients ($\{X_m\}$) comprising the plurality of filters; and learning the one or more dictionary atoms of each of the plurality of filters, based on the training sensor data and the coefficients comprising the plurality of filters.

In another embodiment of the method, a classifier is trained using the concatenated matrix of coefficients forming the plurality of class-discriminative features and the set of classification labels.

In another embodiment of the method, the classifier is used for classification of test data, wherein the classification of data includes the following steps. A test input comprising a test sensor data is obtained. Further, a plurality of test coefficients is computed for each of the plurality of filters, using the test sensor data and learnt dictionary associated with each of the plurality of filters. Further, the plurality of test coefficients of the plurality of filters is concatenated to obtain a concatenated matrix of test coefficients. Further, a set of output labels is estimated for the test sensor data using the concatenated matrix of test coefficients and the trained classifier.

In another embodiment of the method, the training sensor data comprises one of a time series data and an image data.

In another embodiment of the method, the joint optimization is represented as $$\operatorname*{arg\,min}_{\{D_m\}\{X_m\}\{W_m\}} \frac{1}{2}\left\|\sum_{m=1}^{M} D_m X_m - S\right\|_F^2 +$$
$$\lambda \sum_{m=1}^{M} \|X_m\|_1 + \frac{\eta}{2}\left\|Q - \sum_{m=1}^{M} W_m X_m\right\|_F^2$$
$$\text{s.t. } \|D_m\|_2 = 1 \ \forall_m$$

where, $Q \in R^{C \times K}$ represents one hot encoded classification labels for C-classes, and K is the total number of training samples.

In yet another embodiment, a system is provided. The system includes one or more hardware processors, a communication interface, and a memory storing a plurality of instructions. The plurality of instructions cause the one or more hardware processors to receive a training sensor data (S) and a set of classification labels (Q) associated with the training sensor data, as input data. Further, a joint optimization is performed, via the one or more hardware processors, on the input data to learn a plurality of parameters comprising a) one or more dictionary atoms $\{D_m\}$, one or more coefficients $\{X_m\}$ associated with each of the one or more dictionary atoms, and weights $\{W_m\}$ associated with a label consistency term for each of the one or more coefficients for $m^{th}$ filter in a sequence of filters, wherein performing the joint optimization comprises iteratively updating the parameters $\{D_m\}$, $\{X_m\}$, and $\{W_m\}$, till an objective function represented in the joint optimization is converged, wherein a plurality of class-discriminative dictionaries are learnt for each of a plurality of filters, by performing the joint optimization. Further, a plurality of coefficients forming a plurality of class-discriminative features is generated, via the one or more hardware processors, from the plurality of learnt class-discriminative dictionaries and the training sensor data (S). Further, the plurality of coefficients of the plurality of filters are concatenated, via the one or more hardware processors, to obtain a concatenated matrix of coefficients wherein the concatenated matrix of coefficients form a training data for a classifier.

In yet an embodiment of the system, the one or more hardware processors perform the joint optimization by: learning one or more coefficients of each of the plurality of filters based on the training sensor data, the set of classification labels and a dictionary comprising the plurality of filters, and weights associated with a label consistency term comprising the plurality of filters; learning one or more weights associated with a label consistency term of each of the plurality of filters based on the set of classification labels and the coefficients ($\{X_m\}$) comprising the plurality of filters; and learning the one or more dictionary atoms of each of the plurality of filters, based on the training sensor data and the coefficients comprising the plurality of filters.

In yet another embodiment of the system, the one or more hardware processors are configured to train a classifier using the concatenated matrix of coefficients forming the plurality of class-discriminative features and the set of classification labels.

In yet another embodiment of the system, the classifier is used for classification of test data, wherein the classification of data includes the following steps. A test input comprising a test sensor data is obtained. Further, a plurality of test coefficients is computed for each of the plurality of filters, using the test sensor data and learnt dictionary associated with each of the plurality of filters. Further, the plurality of test coefficients of the plurality of filters is concatenated to obtain a concatenated matrix of test coefficients. Further, a set of output labels is estimated for the test sensor data using the concatenated matrix of test coefficients and the trained classifier.

In yet another embodiment of the system, the training sensor data comprises one of a time series data and an image data.

In yet another embodiment of the system, the joint optimization is represented as $$\operatorname*{arg\,min}_{\{D_m\}\{X_m\}\{W_m\}} \frac{1}{2}\left\|\sum_{m=1}^{M} D_m X_m - S\right\|_F^2 +$$
$$\lambda \sum_{m=1}^{M} \|X_m\|_1 + \frac{\eta}{2}\left\|Q - \sum_{m=1}^{M} W_m X_m\right\|_F^2$$
$$\text{s.t. } \|D_m\|_2 = 1 \ \forall_m$$

where, $Q \in R^{C \times K}$ represents one hot encoded classification labels for C-classes, and K is the total number of training samples.

In yet another aspect, a non-transitory computer readable medium is provided. The non-transitory computer readable medium includes a plurality of instructions, which when executed, cause one or more hardware processors to receive a training sensor data (S) and a set of classification labels (Q) associated with the training sensor data, as input data. Further, a joint optimization is performed, via the one or more hardware processors, on the input data to learn a plurality of parameters comprising a) one or more dictionary atoms $\{D_m\}$, one or more coefficients $\{X_m\}$ associated with each of the one or more dictionary atoms, and weights $\{W_m\}$ associated with a label consistency term for each of the one or more coefficients for $m^{th}$ filter in a sequence of filters, wherein performing the joint optimization comprises iteratively updating the parameters $\{D_m\}$, $\{X_m\}$, and $\{W_m\}$, till an objective function represented in the joint optimization is converged, wherein a plurality of class-discriminative dictionaries are learnt for each of a plurality of filters, by performing the joint optimization. Further, a plurality of coefficients forming a plurality of class-discriminative features is generated, via the one or more hardware processors, from the plurality of learnt class-discriminative dictionaries and the training sensor data (S). Further, the plurality of coefficients of the plurality of filters are concatenated, via the one or more hardware processors, to obtain a concatenated matrix of coefficients wherein the concatenated matrix of coefficients form a training data for a classifier.

In an embodiment of the non-transitory computer readable medium, performing the joint optimization includes learning one or more coefficients of each of the plurality of filters based on the training sensor data, the set of classification labels and a dictionary comprising the plurality of filters, and weights associated with a label consistency term comprising the plurality of filters; learning one or more weights associated with a label consistency term of each of the plurality of filters based on the set of classification labels and the coefficients ($\{X_m\}$) comprising the plurality of filters; and learning the one or more dictionary atoms of each of the plurality of filters, based on the training sensor data and the coefficients comprising the plurality of filters.

In another embodiment of the non-transitory computer readable medium, a classifier is trained using the concatenated matrix of coefficients forming the plurality of class-discriminative features and the set of classification labels.

In another embodiment of the non-transitory computer readable medium, the classifier is used for classification of test data, wherein the classification of data includes the following steps. A test input comprising a test sensor data is obtained. Further, a plurality of test coefficients is computed for each of the plurality of filters, using the test sensor data and learnt dictionary associated with each of the plurality of filters. Further, the plurality of test coefficients of the plurality of filters is concatenated to obtain a concatenated matrix of test coefficients. Further, a set of output labels is estimated for the test sensor data using the concatenated matrix of test coefficients and the trained classifier.

In another embodiment of the non-transitory computer readable medium, the training sensor data comprises one of a time series data and an image data.

In another embodiment of the non-transitory computer readable medium, the joint optimization is represented as $$\underset{\{D_m\}\{X_m\}\{W_m\}}{\arg\min} \frac{1}{2}\left\|\sum_{m=1}^{M} D_m X_m - S\right\|_F^2 +$$
$$\lambda \sum_{m=1}^{M} \|X_m\|_1 + \frac{\eta}{2}\left\|Q - \sum_{m=1}^{M} W_m X_m\right\|_F^2$$
$$\text{s.t. } \|D_m\|_2 = 1 \ \forall_m$$

where, $Q \in R^{C \times K}$ represents one hot encoded classification labels for C-classes, and K is the total number of training samples.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flow diagram depicting steps involved in the process of machine fault classification, by the system of FIG. 1, according to some embodiments of the present disclosure.

FIG. 3 is a flow diagram depicting steps involved in the process of joint optimization, by the system of FIG. 1, according to some embodiments of the present disclosure.

FIG. 4 is a flow diagram depicting steps involved in the process of classification of data, by a classifier of the system of FIG. 1, according to some embodiments of the present disclosure.

DETAILED DESCRIPTION

Figure 1:
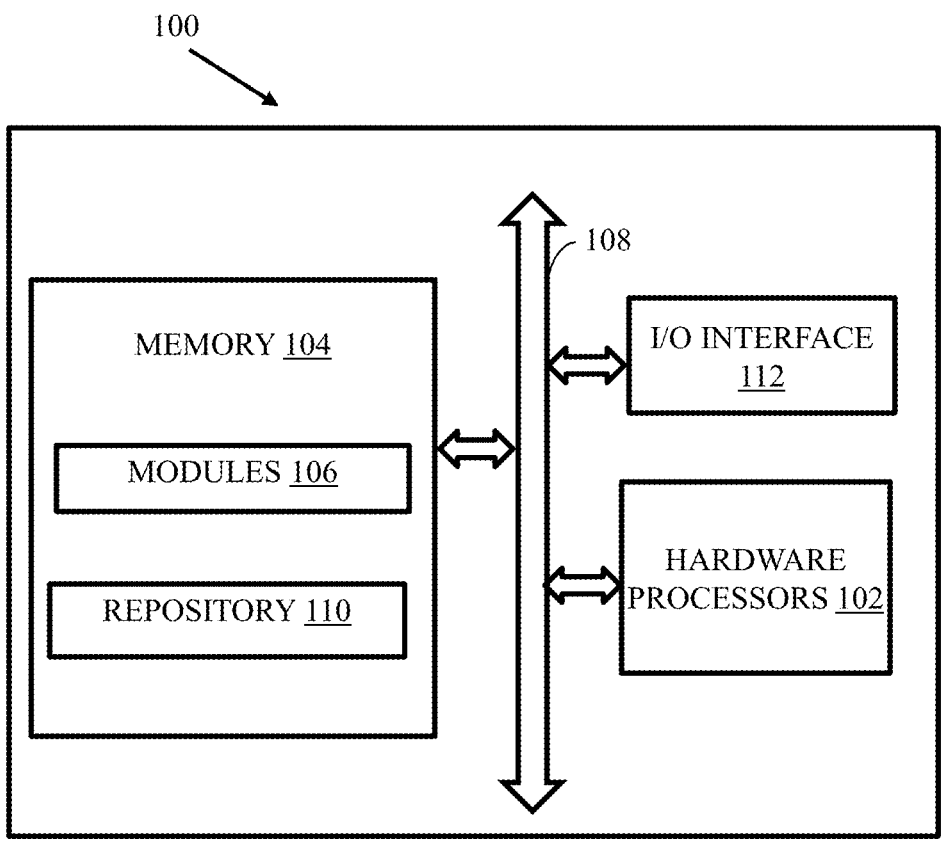
FIG. 1 illustrates an exemplary system for machine fault classification, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In order to address these challenges, a method and system for machine fault classification using label-consistent convolutional dictionary learning is provided. The method includes receiving a training sensor data (S) and a set of classification labels (Q) associated with the training sensor data, as input data. Further, a joint optimization is performed on the input data to learn a plurality of parameters comprising a) one or more dictionary atoms $\{D_m\}$, one or more coefficients $\{X_m\}$ associated with each of the one or more dictionary atoms, and weights $\{W_m\}$ associated with a label consistency term for each of the one or more coefficients for mth filter in a sequence of filters, wherein performing the joint optimization comprises iteratively updating the parameters $\{D_m\}$, $\{X_m\}$, and $\{W_m\}$, till an objective function represented in the joint optimization is converged, wherein a plurality of class-discriminative dictionaries are learnt for each of a plurality of filters, by performing the joint optimization. Further, a plurality of coefficients forming a plurality of class-discriminative features is generated via the one or more hardware processors, from the plurality of learnt class-discriminative dictionaries and the training sensor data (S). Further, the plurality of coefficients of the plurality of filters are concatenated, via the one or more hardware processors, to obtain a concatenated matrix of coefficients wherein the concatenated matrix of coefficients form a training data for a classifier. The concatenated matrix of coefficients forming a plurality of class-discriminative features and a set of classification labels is further used to train a classifier. The classifier maybe then used for classification of test data.

Referring now to the drawings, and more particularly to FIG. 1 through FIG. 6B, where similar reference characters denote corresponding features consistently throughout the figures, there are shown preferred embodiments and these embodiments are described in the context of the following exemplary system and/or method.

The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of machine fault classification, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the machine fault classification.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to the steps in flow diagrams in FIG. 2, FIG. 3, and FIG. 4.

FIG. 2 is a flow diagram depicting steps involved in the process of machine fault classification, by the system of FIG. 1, according to some embodiments of the present disclosure. In an embodiment, the system 100 comprises one or more data storage devices or the memory 104 operatively coupled to the processor(s) 102 and is configured to store instructions for execution of steps of the method 200 by the processor(s) or one or more hardware processors 102. The steps of the method 200 of the present disclosure will now be explained with reference to the components or blocks of the system 100 as depicted in FIG. 1 and the steps of flow diagram as depicted in FIGS. 2, 3, and 4. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of method 200 in FIG. 2, the system 100 receives a training sensor data (S) and a set of classification labels (Q) associated with the training sensor data, as input data. The training sensor data comprises one of a time series data and an image data.

Further, at step 204 of the method 200, the system 100 performs a joint optimization, via the one or more hardware processors 102, on the input data to learn a plurality of parameters comprising a) one or more dictionary atoms $\{D_m\}$, one or more coefficients $\{X_m\}$ associated with each of the one or more dictionary atoms, and weights $\{W_m\}$ associated with a label consistency term for each of the one or more coefficients for $m^{th}$ filter in a sequence of filters. The joint optimization is represented as:

$$\underset{\{D_m\}\{X_m\}\{W_m\}}{\arg\min} \frac{1}{2}\left\|\sum_{m=1}^{M} D_m X_m - S\right\|_F^2 + \tag{1}$$

$$\lambda \sum_{m=1}^{M} \|X_m\|_1 + \frac{\eta}{2}\left\|Q - \sum_{m=1}^{M} W_m X_m\right\|_F^2$$

$$\text{s.t. } \|D_m\|_2 = 1 \,\forall_m$$

where, $Q \in R^{C \times K}$ represents one hot encoded classification labels for C-classes such that $Q_{ij}=1$ if a data sample j belongs to class i, and 0 otherwise, and K is the total number of training samples. First two terms of equation (1) ensure that the dictionary atoms and associated sparse coefficients are learnt for data samples S such that associated reconstruction error is below a threshold. The last term of equation (1) is a label-consistency term which is used to assist in the learning of class-discriminative dictionaries such that the same class features map to the same class label. The hyperparameters $\lambda$ and $\eta$ control the sparsity of the learnt coefficients, and trade-off between the reconstruction and label-consistency terms, respectively.

The system 100 performs the joint optimization using the approach depicted in method 300 in FIG. 3, and is explained hereafter. At step 302 of the method 300, the system 100 learns one or more coefficients of each of the plurality of filters based on the training sensor data, the set of classification labels and a dictionary comprising the plurality of filters, and weights associated with a label consistency term comprising the plurality of filters. Further, at step 304 of the method 300, the system 100 learns one or more weights associated with a label consistency term of each of the plurality of filters based on the set of classification labels and the coefficients ($\{X_m\}$) comprising the plurality of filters. Further, at step 306 of the method 300, the system 100 learns the one or more dictionary atoms of each of the plurality of filters, based on the training sensor data and the coefficients comprising the plurality of filters. By performing the joint optimization, the system 100 iteratively updates the parameters $\{D_m\}$, $\{X_m\}$, and $\{W_m\}$, till an objective function represented in the joint optimization is converged, wherein a plurality of class-discriminative dictionaries are learnt for each of a plurality of filters, by performing the joint optimization. The system 100 may use an alternating minimization approach to estimate $\{D_m\}$, $\{X_m\}$, and $\{W_m\}$. In the alternating minimization approach, the subproblem to solve for $\{D_m\}$, $\{X_m\}$, and $\{W_m\}$ are given as:

$$\{D_m\} \leftarrow \underset{\{D_m\}}{\arg\min} \frac{1}{2} \left\| \sum_{m=1}^{M} D_m X_m - S \right\|_F^2 \tag{2}$$

$$\text{s.t. } \|D_m\|_2 = 1 \ \forall \ m \tag{3}$$

$$\{X_m\} \leftarrow$$

$$\underset{\{X_m\}}{\arg\min} \frac{1}{2} \left\| \sum_{m=1}^{M} D_m X_m - S \right\|_F^2 + \lambda \sum_{m=1}^{M} \|X_m\|_1 + \frac{\eta}{2} \left\| Q - \sum_{m=1}^{M} W_m X_m \right\|_F^2$$

$$\{W_m\} \leftarrow \underset{\{W_m\}}{\arg\min} \left\| Q - \sum_{m=1}^{M} W_m X_m \right\|_F^2 \tag{4}$$

Weights associated with the label consistency term $W_m$ are obtained as:

$$W_m = \left( Q - \sum_{j=1, j \neq m}^{M} W_j X_j \right) X_m^\dagger \tag{5}$$

Where, $\dagger$ denotes pseudo-inverse. Update for coefficients $X_m$ are obtained by variable splitting, by introducing an auxiliary variable $Y_m$. Using this the equation for $X_m$ update is re-written as:

$$\underset{\{X_m\},\{Y_m\}}{\arg\min} \frac{1}{2} \left\| \sum_{m=1}^{M} D_m X_m - S \right\|_F^2 + \lambda \sum_{m=1}^{M} \|Y_m\|_1 + \frac{\eta}{2} \left\| Q - \sum_{m=1}^{M} W_m X_m \right\|_F^2 \tag{6}$$

$$\text{s.t. } X_m - Y_m = 0$$

The system 100 then solves (6) using a suitable approach. In an embodiment, the system 100 may use an ADMM approach for solving for $X_m$ and $Y_m$, as:

$$X_m = \underset{\{X_m\}}{\arg\min} \frac{1}{2} \left\| \sum_{m=1}^{M} D_m X_m - S \right\|_F^2 + \tag{7}$$

$$\frac{\eta}{2} \left\| Q - \sum_{m=1}^{M} W_m X_m \right\|_F^2 + \frac{\rho}{2} \sum_{m=1}^{M} \|X_m - Y_m + U_m\|_F^2$$

$$Y_m = \underset{\{Y_m\}}{\arg\min} \lambda \sum_{m=1}^{M} \|Y_m\|_1 + \frac{\rho}{2} \sum_{m=1}^{M} \|X_m - Y_m + u_m\|_F^2 \tag{8}$$

where, $\rho$ controls convergence rate of an algorithm, and value of $\rho$ is kept as a constant by introducing an equality constraint at convergence. A closed form update for $X_m$ is obtained by expanding (7) in terms of trace and equating derivative with respect to $X_m$ to 0. Hence $X_m$ is updated as:

$$X_m = \left( D_m^T D_m + \eta W_m^T W_m + \rho \right)^{-1} \left( D_m^T S + \eta W_m^T Q - D_m^T \sum_{j=1, j \neq m}^{M} D_j X_j - \eta W_m^T \sum_{j=1, j \neq m}^{M} W_j X_j + \rho(Y_m - U_m) \right) \tag{9}$$

Similarly, $Y_m$ is updated as:

$$Y_m = S_{\lambda/\rho}(X_m + U_m) \tag{10}$$

where, $S_\gamma(V) = \text{sign}(V) \odot \max(0, |V| - \gamma)$, and $\odot$ denotes element-wise multiplication. The dual variable $U_m$ corresponds to a constraint $X_m - Y_m = 0$, and is updated using arithmetic operations.

Referring back to the method 200, at step 206, the system 100 generates a plurality of coefficients forming a plurality of class-discriminative features, via the one or more hardware processors 102, from the plurality of learnt class-discriminative dictionaries and the training sensor data (S). Further, at step 208 of the method 200, the system 100 concatenates the plurality of coefficients of the plurality of filters to obtain a concatenated matrix of coefficients. The concatenated matrix of coefficients forms a training data for a classifier.

The classifier is trained using the concatenated matrix of coefficients forming the plurality of class-discriminative features and the set of classification labels. The trained classifier maybe then used for classification of data, and particularly for the machine fault classification. Steps involved in the process of performing the classification of data are depicted in method 400 in FIG. 4, and are explained here. At step 402 of the method 400, a test input comprising a test sensor data is obtained. Further, at step 404 of the method 400, a plurality of test coefficients is computed for each of the plurality of filters, using the test sensor data and learnt dictionary associated with each of the plurality of filters. Further, at step 406 of the method 400, the plurality of test coefficients of the plurality of filters is concatenated to obtain a concatenated matrix of test coefficients. Further, at step 408 of the method 400, a set of output labels is estimated for the test sensor data using the concatenated matrix of test coefficients and the trained classifier. The classification of data using the trained classifier maybe referred to as a test phase, wherein in the test phase, given a test data sample $S^{test}$, corresponding coefficient $$\{X_m^{test}\}$$

is estimated using dictionary atoms $\{D_m\}$, as:

$$\{X_m^{test}\} \leftarrow \arg\min_{\{X_m^{test}\}} \frac{1}{2}\left\|\sum_{m=1}^{M} D_m X_m^{test} - S^{test}\right\|_F^2 + \lambda \sum_{m=1}^{M}\|X_m^{test}\|_1 \qquad (11)$$

EXPERIMENTAL DATA

A. Dataset

During the experiments, a publicly available CWRU dataset was used for bearing fault classification. The CWRU contains vibration data collected at 12 kHz for both healthy and faulty bearings acquired at the drive end and fan end of the motor. The experimental setup comprised of a 2 hp motor, a torque encoder, a dynamometer, and control electronics for data collection. Three different faults, namely (i) Ball fault, (ii) Inner Race fault, and (iii) Outer Race fault of different diameters (7 mils, 14 mils, and 21 mils), were investigated. Data was collected for four distinct operating conditions of 0 hp, 1 hp, 2 hp, and 3 hp, with the motor speed varying from 1797 to 1720 rpm. For this work, the faulty bearing data corresponding to 7 mils diameter, obtained from the drive end of the motor was considered, and data from all operating conditions (0-3 hp) was combined for performance evaluation.

B. Baseline Methods

The method 200 was compared against two deep learning methods. They include 1-dimensional CNN (1D-CNN) and Semi-supervised Time series classification (SemiTime). The 1D-CNN method employs a single 1D-convolution layer with 2 filters followed by a fully connected layer with a ReLU activation function. Note that the number of layers and filters in 1D-CNN method were considered same as that of the method 200 for a fair comparison. However, Semi-Time employed 4-layer 1D-CNN with batch normalization. It can work both in a supervised and semi-supervised setting. Here, the supervised setting of SemiTime was used for comparison. Additionally, results for Label-Consistent Dictionary Learning (LC-DL) has been provided to demonstrate the potential of CDL over standard DL methods. Similar to the method 200, LC-DL employed the label-consistency term but with a standard DL formulation to learn the class-discriminative dictionary and the coefficients. The learned dictionary was used to compute the coefficients which were fed to the external classifier.

C. Experimental Results

The raw data was normalized and split into windows of $n=1024$ samples with a 50% overlap, resulting in 3744 samples. The performance of all the methods was evaluated using the accuracy metric with training sets of 10%, 20%, 30%, and 50%. For each training set, 10% of the data is used for validation, and the remaining was used for testing. In both LC-DL and the method 200, SVM with a degree 2 polynomial kernel was used as the external classifier. However, in general, any suitable classifier can be used. The hyperparameter tuning for the method 200 was carried out using grid search, and the optimal values obtained are $\eta=1$, $\lambda=0.2$, $\rho=200$, and $M=2$. The results obtained with different methods, averaged over 10 independent runs is presented in Table I.

TABLE I

| Methods | Training data | | | |
| --- | --- | --- | --- | --- |
| | 10% | 20% | 30% | 50% |
| 1D-CNN | 0.49 | 0.64 | 0.81 | 0.90 |
| SemiTime | 0.40 | 0.73 | 0.82 | 0.95 |
| LC-DL | 0.43 | 0.57 | 0.68 | 0.88 |
| Method 200 | 0.85 | 0.90 | 0.92 | 0.97 |

Figure 5:
FIG. 5 is an example diagram depicting convergence of an objective function, according to some embodiments of the present disclosure.

It could be observed that the method 200 achieved better results compared to other benchmarks across all training sets. Among the deep learning based methods, SemiTime provides a superior performance. Note that with 50% training data, SemiTime performed similar to method 200. However, when the training data reduced (10% or 20%), all the deep learning based methods failed to learn efficient representations, resulting in poor accuracy. The method 200 demonstrated superior performance compared to all other methods, including the LC-DL method. This can be attributed to the fact that the shift-invariant basis of LC-CDL efficiently captures the transient events of vibration signals, resulting in learning good representations. The shift-invariant property of CDL combined with label-consistency helped in learning class discriminative features and hence, a single layer configuration of CDL with significantly less training data outperformed state of-the-art methods. The convergence plot of the objective function in (4) with 20% training data is shown in FIG. 5. It shows that the method 200 converges quickly, within a few iterations.

D. Ablation Study

An ablation study has been provided to understand the impact of different hyperparameters on the performance of the method 200. A comparative analysis of the method 200 with different configurations of CDL for additional insights also has been provided.

Figures 6A, 6B:
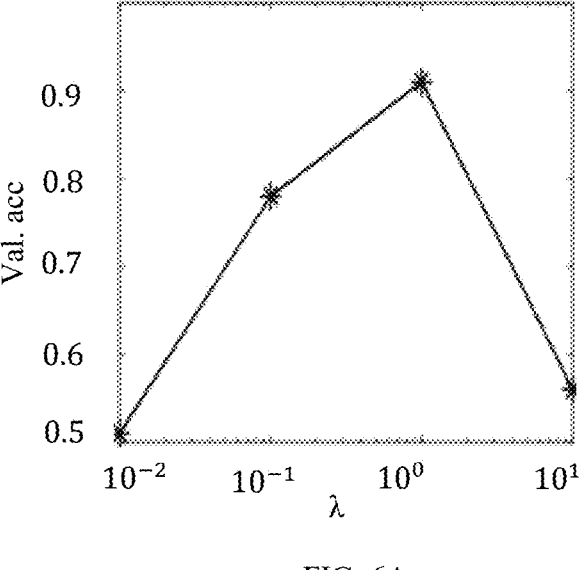
FIGS. 6A and 6B are example diagrams depicting validation accuracy with 20% training data for different values of $\lambda$ and $\eta$, according to some embodiments of the present disclosure.

1) Selection of hyperparameters: There are two hyperparameters associated with the LC-CDL formulation, namely A that denotes the sparsity of the coefficients, and q that denotes the trade-off between the reconstruction and label consistency term. To determine the optimal values of these hyperparameters, these parameters were varied one at a time while keeping the other fixed and measured the resulting impact on the validation accuracy. FIGS. 6A and 6B present the validation accuracy with 20% of the training data for different values of A and q, respectively. For the case of q, it was observed that $n=1.0$ gave the best accuracy on the validation set. This value provides equal importance to the reconstruction and label-consistency term. For the case of $\lambda$, the validation accuracy improved progressively up to $\lambda=0.2$, beyond that a drop in performance was observed. These optimal value of $\eta$ and $\lambda$, were employed to generate the results for the method 200 presented in Table I.

2) Configurations of CDL: The LC-CDL approach in the method 200 employs an external non-linear classifier for classification. Two different configurations of CDL were considered for comparison with the method 200: (i) LC-CDL without external classifier, and (ii) CDL without label consistency. The first configuration incorporates only CDL and label consistency block of LC-CDL, and do not use an external classifier block. Here, the weights of the label-consistency term acts as a linear classifier and used for classification. The second configuration employs CDL and external classifier blocks of LC-CDL, where the CDL learns the features without the label consistency block. An external non-linear classifier was used on the learned features. Table II presents the experimental results obtained by the different configurations and the LC-CDL approach in the method 200. Additionally, comparisons with 1D-CNN method with linear activation are also presented that is similar in nature to the LC-CDL without the external classifier. It can be observed that the method 200 outperforms other methods. Although the first configuration yields marginally better results than the 1D-CNN, it was not able to capture the non-linearities in the data and hence does not perform well. The second configuration performed better than the former methods as it uses a non-linear classifier. However, the representations or features learnt by them were not class-discriminative as they did not utilize the label information. The joint learning of the CDL and the label consistency term in the method 200 facilitated the acquisition of class-discriminative features, that led to better performance with the help of an external non-linear classifier.

TABLE II

| Methods | Training data | |
|---|---|---|
| | 10% | 20% |
| 1D-CNN with linear activation | 0.34 | 0.41 |
| LC-CDL without external classifier | 0.41 | 0.42 |
| CDL without label consistency | 0.65 | 0.76 |
| LC-CDL with external classifier (method 200) | 0.85 | 0.90 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of machine fault classification. The embodiment, thus provides method and system of machine fault classification using label-consistent convolutional dictionary learning. Moreover, the embodiments herein further provide a classifier trained using a plurality of coefficients obtained using LC-CDL forming a plurality of class-discriminative features, for performing the machine fault classification.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
 receiving, via one or more hardware processors, a training sensor data (S) and a set of classification labels (Q) associated with the training sensor data, as input data;

performing, via the one or more hardware processors, a joint optimization on the input data to learn a plurality of parameters comprising a) one or more dictionary atoms $\{D_m\}$, one or more coefficients $\{X_m\}$ associated with each of the one or more dictionary atoms, and weights $\{W_m\}$ associated with a label consistency term for each of the one or more coefficients for $m^{th}$ filter in a sequence of filters, wherein performing the joint optimization comprises iteratively updating the parameters $\{D_m\}$, $\{X_m\}$, and $\{W_m\}$, till an objective function represented in the joint optimization is converged, wherein a plurality of class-discriminative dictionaries are learnt for each of a plurality of filters, by performing the joint optimization, wherein the joint optimization is represented as $$\underset{\{D_m\}\{X_m\}\{W_m\}}{\arg\min} \frac{1}{2}\left\|\sum_{m=1}^{M} D_m X_m - S\right\|_F^2 +$$
$$\lambda \sum_{m=1}^{M} \|X_m\|_1 + \frac{\eta}{2}\left\|Q - \sum_{m=1}^{M} W_m X_m\right\|_F^2$$
$$\text{s.t. } \|D_m\|_2 = 1 \ \forall_m,$$

where, $Q \in R^{C \times K}$ represents one hot encoded classification labels for C-classes, and K is the total number of training samples;

generating, via the one or more hardware processors, a plurality of coefficients forming a plurality of class-discriminative features, from the plurality of learnt class-discriminative dictionaries and the training sensor data (S); concatenating, via the one or more hardware processors, the plurality of coefficients of the plurality of filters to obtain a concatenated matrix of coefficients wherein the concatenated matrix of coefficients form a training data for a classifier, wherein the classifier is trained using the concatenated matrix of coefficients forming the plurality of class-discriminative features and the set of classification labels; and using, via the one or more hardware processors, the trained classifier for performing machine fault classification.

2. The method of claim 1, wherein performing the joint optimization comprises:

learning one or more coefficients of each of the plurality of filters based on the training sensor data, the set of classification labels and a dictionary comprising the plurality of filters, and weights associated with a label consistency term comprising the plurality of filters;

learning one or more weights associated with a label consistency term of each of the plurality of filters based on the set of classification labels and the coefficients ($\{X_m\}$) comprising the plurality of filters; and learning the one or more dictionary atoms of each of the plurality of filters, based on the training sensor data and the coefficients comprising the plurality of filters.

3. The method of claim 1, wherein the classifier is used for classification of test data, comprising:

obtaining a test input comprising a test sensor data;

computing a plurality of test coefficients for each of the plurality of filters, using the test sensor data and learnt dictionary associated with each of the plurality of filters;

concatenating the plurality of test coefficients of the plurality of filters to obtain a concatenated matrix of test coefficients; and estimating a set of output labels for the test sensor data using the concatenated matrix of test coefficients and the trained classifier.

4. The method of claim 1, wherein the training sensor data comprises one of a time series data and an image data.

5. A system, comprising:

one or more hardware processors;

a communication interface; and a memory storing a plurality of instructions, wherein the plurality of instructions cause the one or more hardware processors to:

receive a training sensor data (S) and a set of classification labels (Q) associated with the training sensor data, as input data;

perform a joint optimization on the input data to learn a plurality of parameters comprising a) one or more dictionary atoms $\{D_m\}$, one or more coefficients $\{X_m\}$ associated with each of the one or more dictionary atoms, and weights $\{W_m\}$ associated with a label consistency term for each of the one or more coefficients for $m^{th}$ filter in a sequence of filters, wherein performing the joint optimization comprises iteratively updating the parameters $\{D_m\}$, $\{X_m\}$, and $\{W_m\}$, till an objective function represented in the joint optimization is converged, wherein a plurality of class-discriminative dictionaries are learnt for each of a plurality of filters, by performing the joint optimization, wherein the joint optimization is represented as $$\underset{\{D_m\}\{X_m\}\{W_m\}}{\arg\min} \frac{1}{2}\left\|\sum_{m=1}^{M} D_m X_m - S\right\|_F^2 +$$
$$\lambda \sum_{m=1}^{M} \|X_m\|_1 + \frac{\eta}{2}\left\|Q - \sum_{m=1}^{M} W_m X_m\right\|_F^2$$
$$\text{s.t. } \|D_m\|_2 = 1 \ \forall_m,$$

where, $Q \in R^{C \times K}$ represents one hot encoded classification labels for C-classes, and K is the total number of training samples;

generate a plurality of coefficients forming a plurality of class-discriminative features, from the plurality of learnt class-discriminative dictionaries and the training sensor data (S);

concatenate the plurality of coefficients of the plurality of filters to obtain a concatenated matrix of coefficients wherein the concatenated matrix of coefficients form a training data for a classifier, wherein the classifier is trained using the concatenated matrix of coefficients forming the plurality of class-discriminative features and the set of classification labels; and use the trained classifier for performing machine fault classification.

6. The system of claim 5, wherein the one or more hardware processors are configured to perform the joint optimization by:

learning one or more coefficients of each of the plurality of filters based on the training sensor data, the set of classification labels and a dictionary comprising the plurality of filters, and weights associated with a label consistency term comprising the plurality of filters;

learning one or more weights associated with a label consistency term of each of the plurality of filters based on the set of classification labels and the coefficients ($\{X_m\}$) comprising the plurality of filters; and learning the one or more dictionary atoms of each of the plurality of filters, based on the training sensor data and the coefficients comprising the plurality of filters.

7. The system of claim 5, wherein the one or more hardware processors are configured to use the classifier for classification of test data, by:

obtaining a test input comprising a test sensor data;

computing a plurality of test coefficients for each of the plurality of filters, using the test sensor data and learnt dictionary associated with each of the plurality of filters;

concatenating the plurality of test coefficients of the plurality of filters to obtain a concatenated matrix of test coefficients; and estimating a set of output labels for the test sensor data using the concatenated matrix of test coefficients and the trained classifier.

8. The system of claim 5, wherein the training sensor data comprises one of a time series data and an image data.

9. One or more non-transitory machine-readable information storage mediums comprising one or more instructions which when executed by one or more hardware processors cause:

receiving a training sensor data (S) and a set of classification labels (Q) associated with the training sensor data, as input data;

performing, via the one or more hardware processors, a joint optimization on the input data to learn a plurality of parameters comprising a) one or more dictionary atoms $\{D_m\}$, one or more coefficients $\{X_m\}$ associated with each of the one or more dictionary atoms, and weights $\{W_m\}$ associated with a label consistency term for each of the one or more coefficients for $m^{th}$ filter in a sequence of filters, wherein performing the joint optimization comprises iteratively updating the parameters $\{D_m\}$, $\{X_m\}$, and $\{W_m\}$, till an objective function represented in the joint optimization is converged, wherein a plurality of class-discriminative dictionaries are learnt for each of a plurality of filters, by performing the joint optimization, wherein the joint optimization is represented as $$\underset{\{D_m\}\{X_m\}\{W_m\}}{\arg\min} \frac{1}{2}\left\|\sum_{m=1}^{M} D_m X_m - S\right\|_F^2 +$$

$$\lambda \sum_{m=1}^{M} \|X_m\|_1 + \frac{\eta}{2}\left\|Q - \sum_{m=1}^{M} W_m X_m\right\|_F^2$$

$$\text{s.t. } \|D_m\|_2 = 1 \ \forall_m,$$

where, $Q \in R^{C \times K}$ represents one hot encoded classification labels for C-classes, and K is the total number of training samples;

generating a plurality of coefficients forming a plurality of class-discriminative features, from the plurality of learnt class-discriminative dictionaries and the training sensor data (S);

concatenating the plurality of coefficients of the plurality of filters to obtain a concatenated matrix of coefficients wherein the concatenated matrix of coefficients form a training data for a classifier, wherein the classifier is trained using the concatenated matrix of coefficients forming the plurality of class-discriminative features and the set of classification labels; and using the trained classifier for performing machine fault classification.

10. The one or more non-transitory machine-readable information storage mediums of claim 9, wherein performing the joint optimization comprises:

learning one or more coefficients of each of the plurality of filters based on the training sensor data, the set of classification labels and a dictionary comprising the plurality of filters, and weights associated with a label consistency term comprising the plurality of filters;

learning one or more weights associated with a label consistency term of each of the plurality of filters based on the set of classification labels and the coefficients ($\{X_m\}$) comprising the plurality of filters; and learning the one or more dictionary atoms of each of the plurality of filters, based on the training sensor data and the coefficients comprising the plurality of filters.

11. The one or more non-transitory machine-readable information storage mediums of claim 9, wherein the one or more instructions which when executed by the one or more hardware processors cause the classifier to perform classification of test data, by:

obtaining a test input comprising a test sensor data;

computing a plurality of test coefficients for each of the plurality of filters, using the test sensor data and learnt dictionary associated with each of the plurality of filters;

concatenating the plurality of test coefficients of the plurality of filters to obtain a concatenated matrix of test coefficients; and estimating a set of output labels for the test sensor data using the concatenated matrix of test coefficients and the trained classifier.

12. The one or more non-transitory machine-readable information storage mediums of claim 9, wherein the training sensor data comprises one of a time series data and an image data.

* * * * *